United States Patent
Chen et al.

(10) Patent No.: US 12,535,946 B2
(45) Date of Patent: Jan. 27, 2026

(54) SHARED MEDIA STREAM DISPLAY METHOD COMPRISING DISPLAYING FLOATING CONTROL AND DISPLAYING SHARED MEDIA STREAM AND CONTROL IN FLOATING CONTROL, APPARATUS, DEVICE, AND STORAGE MEDIUM

(71) Applicant: Beijing Zitiao Network Technology Co., Ltd., Beijing (CN)

(72) Inventors: Shuyu Chen, Beijing (CN); Zijun Zhou, Beijing (CN); Haiyun Chen, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/761,209

(22) Filed: Jul. 1, 2024

(65) Prior Publication Data
US 2024/0393936 A1 Nov. 28, 2024

Related U.S. Application Data

(63) Continuation of application No. PCT/CN2023/091693, filed on Apr. 28, 2023.

(30) Foreign Application Priority Data
May 6, 2022 (CN) .......................... 202210488369.6

(51) Int. Cl.
G06F 3/04842 (2022.01)
G06F 3/04847 (2022.01)
G06F 3/0488 (2022.01)

(52) U.S. Cl.
CPC ...... *G06F 3/04847* (2013.01); *G06F 3/04842* (2013.01); *G06F 3/0488* (2013.01)

(58) Field of Classification Search
CPC . G06F 3/04847; G06F 3/04842; G06F 3/0488
See application file for complete search history.

(56) References Cited

U.S. PATENT DOCUMENTS 9,118,723 B1 * 8/2015 Su ........................... G06F 15/00
11,190,735 B1 * 11/2021 Trim ...................... G06V 20/52
(Continued)

FOREIGN PATENT DOCUMENTS

| CN | 103595775 A | 2/2014 |
|---|---|---|
| CN | 105554280 A | 5/2016 |

(Continued)

OTHER PUBLICATIONS

CN114116101A (Eng Translation) published on Mar. 1, 2022.*
(Continued)

*Primary Examiner* — Rinna Yi
(74) *Attorney, Agent, or Firm* — Astute IP Law Group

(57) ABSTRACT

The embodiment of the disclosure discloses an information display method, an apparatus, a device and a storage medium. The method includes: displaying a first content corresponding to a first user in a target interface of a preset application program, displaying a floating control in the target interface, and displaying a shared media stream in the floating control, in which the shared media stream includes a media stream corresponding to a shared interaction between the first user and at least one second user; and displaying a preset control in the floating control, in which the preset control is used for at least one of the following: displaying associated information of the shared interaction between the first user and the at least one second user or controlling the shared interaction between the first user and the at least one second user.

19 Claims, 7 Drawing Sheets

(56) References Cited

U.S. PATENT DOCUMENTS

| | | | | |
|---|---|---|---|---|
| 11,431,665 | B1* | 8/2022 | Ali | H04L 12/1822 |
| 2008/0003985 | A1* | 1/2008 | Jung | H04N 21/4314 |
| | | | | 348/E7.083 |
| 2009/0024927 | A1* | 1/2009 | Schrock | H04L 67/306 |
| | | | | 715/722 |
| 2015/0019694 | A1* | 1/2015 | Feng | G06F 3/1462 |
| | | | | 709/219 |
| 2017/0093769 | A1* | 3/2017 | Lind | G06F 3/1454 |
| 2018/0234738 | A1 | 8/2018 | Sarkar et al. | |
| 2018/0352303 | A1 | 12/2018 | Siddique et al. | |
| 2022/0269405 | A1* | 8/2022 | Wu | H04M 1/72439 |
| 2022/0350564 | A1 | 11/2022 | Cao | |
| 2022/0365740 | A1* | 11/2022 | Chang | G06F 3/0488 |

FOREIGN PATENT DOCUMENTS

| | | | |
|---|---|---|---|
| CN | 105898615 | A | 8/2016 |
| CN | 106528021 | A | 3/2017 |
| CN | 107656671 | A | 2/2018 |
| CN | 111541930 | A | 8/2020 |
| CN | 112437326 | A | 3/2021 |
| CN | 112764631 | A | 5/2021 |
| CN | 112911368 | A | 6/2021 |
| CN | 113141483 | A | 7/2021 |
| CN | 113489937 | A | 10/2021 |
| CN | 113630511 | A | 11/2021 |
| CN | 113709026 | A | 11/2021 |
| CN | 114116101 | A | 3/2022 |
| CN | 114385298 | A | 4/2022 |
| CN | 114911399 | A | 8/2022 |
| CN | 115617436 | A | 1/2023 |
| CN | 114911399 | B | 1/2025 |
| EP | 4192019 | A1 | 6/2023 |
| WO | 2021143391 | A1 | 7/2021 |
| WO | 2022042382 | A1 | 3/2022 |
| WO | 2023/213245 | A1 | 11/2023 |

OTHER PUBLICATIONS

"How to operate the floating window function of watching videos together with new QQ groups added in the new version", Available online at: <https//jingyan.baidu.com/article/a24b33cdbe8a9558ff002b49.html>, 5 pages (5 pages-1 page of English Translation and 1 page of Original document).

International Search Report and Written Opinion received for PCT Patent Application No. PCT/CN2023/091693, mailed on Aug. 4, 2023, 13 pages (5 pages of English Translation and 8 pages of Original Document).

Office Action received for Chinese Patent Application No. 202210488369.6, mailed on Jan. 16, 2024, 40 pages (17 pages of English Translation and 23 pages of Original Document).

Office Action received for Chinese Patent Application No. 202210488369.6, mailed on Jun. 16, 2024, 34 pages (16 pages of English Translation and 18 pages of Original Document).

Extended European Search Report for European Patent Application No. 23799231.8, mailed on Mar. 17, 2025, 11 pages.

Notification to Grant Patent Right for Invention for Chinese Patent Application No. 202210488369.6, mailed on Jan. 1, 2025, 8 pages.

Office Action for Japanese Patent Application No. 2024-539839, mailed on Aug. 5, 2025, 8 pages.

* cited by examiner

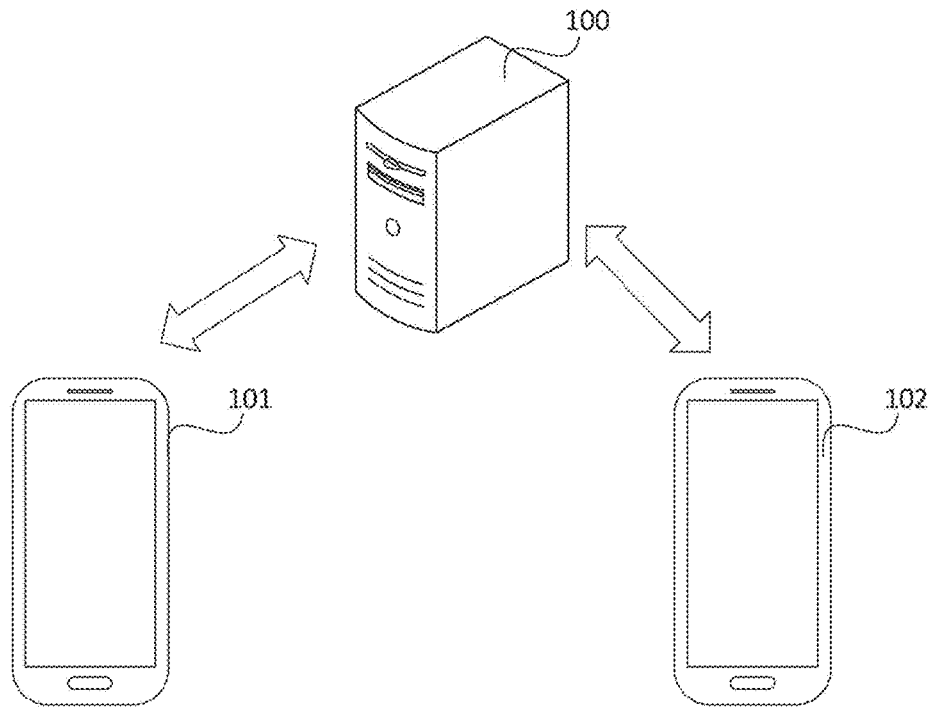

FIG. 1

Displaying a first content corresponding to a first user in a target interface of a preset application program, displaying a floating control in the target interface, and displaying a shared media stream in the floating control, wherein the shared media stream comprises a media stream corresponding to a shared interaction between the first user and at least one second user — 201

Displaying a preset control in the floating control, in which the preset control is configured to at least one of the following: displaying associated information of the shared interaction between the first user and the at least one second user or controlling the shared interaction between the first user and the at least one second user — 202

FIG. 2

SHARED MEDIA STREAM DISPLAY METHOD COMPRISING DISPLAYING FLOATING CONTROL AND DISPLAYING SHARED MEDIA STREAM AND CONTROL IN FLOATING CONTROL, APPARATUS, DEVICE, AND STORAGE MEDIUM

CROSS-REFERENCE TO RELATED APPLICATION

This present application is a continuation of International Patent Application No. PCT/CN2023/091693, filed on Apr. 28, 2023, which claims the priority of Chinese Patent Application No. 202210488369.6 filed on May 6, 2022, and the entire content disclosed by the Chinese patent application is incorporated herein by reference as part of the present application.

TECHNICAL FIELD

The embodiment of the present disclosure relates to the technical field of the Internet, such as an information display method, an apparatus, a device and a storage media.

BACKGROUND

With the rapid development of Internet technology and terminal technology, the interaction between users is becoming more and more convenient. Many users can share the same media stream content, and users who share the media stream can also communicate through real-time voice.

SUMMARY

The embodiment of the disclosure provides an information display method, an information display apparatus, a storage medium and device, which can optimize an information display scheme based on a media stream.

The embodiment of the disclosure provides an information display method, which is applied to a first user side and comprises: displaying a first content corresponding to a first user in a target interface of a preset application program, displaying a floating control in the target interface, and displaying a shared media stream in the floating control, wherein the shared media stream comprises a media stream corresponding to a shared interaction between the first user and at least one second user; and displaying a preset control in the floating control, wherein the preset control is configured to at least one of the following: displaying associated information of the shared interaction between the first user and the at least one second user or controlling the shared interaction between the first user and the at least one second user.

The embodiment of the present disclosure also provides an information display apparatus, which is configured at the first user side, and comprises: a media stream display module, configured to display a first content corresponding to a first user in a target interface of a preset application program, display a floating control in the target interface, and display a shared media stream in the floating control, wherein the shared media stream comprises a media stream corresponding to a shared interaction between the first user and at least one second user; and a control display module, configured to display a preset control in the floating control, wherein the preset control is configured to at least one of the following: displaying associated information of the shared interaction between the first user and the at least one second user or controlling the shared interaction between the first user and the at least one second user.

The embodiment of the disclosure also provides an electronic device, which comprises at least one processor; storage apparatus configured to store at least one program, when the at least one program is executed by the at least one processor, the at least one processor is enabled to realize the information display method provided by the embodiment of the present disclosure.

The embodiment of the present disclosure also provides a storage medium comprising computer-executable instructions, wherein the computer-executable instructions, when executed by a computer processor, are used to perform the information display method provided by the embodiment of the present application.

BRIEF DESCRIPTION OF DRAWINGS

FIG. 1 is a scene architecture diagram of an application scene to which an information display method provided by an embodiment of the present disclosure is applicable;

FIG. 2 is a flowchart of an information display method provided by an embodiment of the present disclosure;

DETAILED DESCRIPTION

Figure 3:
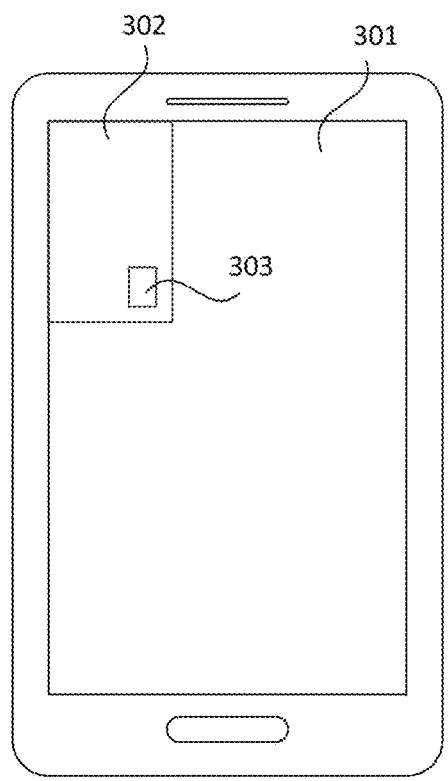
FIG. 3 is a schematic diagram of an interface provided by an embodiment of the present disclosure.

Embodiments of the present disclosure will be described below with reference to the accompanying drawings. Although some embodiments of the present disclosure are shown in the drawings, it should be understood that the present disclosure can be embodied in various forms and should not be construed as limited to the embodiments set forth here, but rather, these embodiments are provided for a more thorough and complete understanding of the present disclosure. It should be understood that the drawings and embodiments of the present disclosure are only used for illustrative purposes, and are not used to limit the protection scope of the present disclosure.

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that concepts such as "first" and "second" mentioned in the present disclosure are only used to distinguish different apparatuses, modules or units, and are not intended to limit orders or interdependence relationships of functions performed by these apparatuses, modules or units.

It should be noted that modifications of "one" and "more" mentioned in the present disclosure are schematic rather than restrictive, and those skilled in the art should understand that unless otherwise explicitly stated in the context, it should be understood as "one or more".

Names of messages or information exchanged among multiple devices in the embodiment of the present disclosure are only used for illustrative purposes, and are not used to limit the scope of these messages or information.

It can be understood that before using the technical solutions disclosed in several embodiments of the present disclosure, users should be informed of the types, application scope and application scenes of personal information involved in the present disclosure in an appropriate way and be authorized by users in accordance with relevant laws and regulations.

For example, in response to receiving the user's active request, prompt information is sent to the user to clearly remind the user that the operation requested by the user will require obtaining and using the user's personal information. Therefore, the user can independently choose whether to provide personal information to software or hardware such as electronic devices, applications, servers or storage media that perform the operation of the technical scheme of the present disclosure according to the prompt information.

As an optional but non-limiting implementation, in response to receiving the user's active request, the way to send the prompt information to the user can be, for example, a pop-up window, in which the prompt information can be presented in text. In addition, the pop-up window can also carry a selection control for the user to choose "agree" or "disagree" to provide personal information to the electronic device.

It can be understood that the above process of notifying and obtaining user authorization is only schematic, and does not limit the implementation of the present disclosure. Other ways to meet relevant laws and regulations can also be applied to the implementation of the present disclosure.

It can be understood that the data involved in this technical scheme (including but not limited to the data itself, data acquisition or use) shall comply with the requirements of corresponding laws, regulations and relevant regulations.

FIG. 1 is a scene architecture diagram of an application scene to which an information display method provided by an embodiment of the present disclosure applies. Referring to FIG. 1, the application scene may include a server 100, a first electronic device 101 and a second electronic device 102. It should be noted that the number of electronic devices can be more, and the number is not limited. FIG. 1 is only used as a schematic illustration. A plurality of electronic devices establish communication connection with the server to realize information interaction. The electronic device can be mobile devices such as mobile phones, smart watches, tablet computers and personal digital assistants; and it can also be other devices such as desktop computers. Users using electronic devices can have real-time call, content sharing and message interaction through preset applications installed on electronic devices, and content sharing can include sharing media streaming (hereinafter referred to as shared interaction). The server can provide support for preset applications. For example, when multiple users share and interact, each user can control the shared video stream, such as switching videos. In the embodiment of the present disclosure, the types of preset applications are not limited, for example, they can be video applications, live broadcast applications, information applications, and other types of applications.

FIG. 2 is a flow chart of an information display method provided by an embodiment of the present disclosure, which is applicable to the case of displaying the media stream. The method can be implemented by an information display apparatus, which can be implemented in the form of software and/or hardware, or alternatively, by an electronic device, which can be used by any user participating in media stream sharing.

As shown in FIG. 2, the method comprises the following steps.

Step 201: displaying a first content corresponding to a first user in a target interface of a preset application program, displaying a floating control in the target interface, and displaying a shared media stream in the floating control, wherein the shared media stream comprises a media stream corresponding to a shared interaction between the first user and at least one second user.

In the embodiment of the present disclosure, the first user is a user currently using the preset application, that is, a local user, which can be understood as an account currently logged in in the preset application is an account of the first user. The target interface can be understood as an interface in a preset application for displaying the content corresponding to the first user, and the type of the content is not limited, for example, it can be media content. Optionally, the content includes a media stream, and the media stream corresponding to the user can be understood as a personalized media stream pushed to the user. The first content may include a first media stream, which may be a media stream pushed to a first user. For example, a corresponding media stream determination method is generated according to the first user, a personalized first media stream for the first user is determined according to the media stream determination method. The media content contained in the media stream can include images, graphics, audio or video, etc.

In the embodiment of the present disclosure, two or more users can be supported to share the media stream in real time, and the second user can be understood as a user who participates in the same media stream sharing with the first user, that is, an end user, and the number of the second users can be one or more, without limitation. The shared media stream includes the media stream corresponding to the shared interaction between the first user and at least one second user, that is, each user participating in the shared interaction can watch the shared media stream through his own electronic device. The source of the shared media stream is not limited.

For example, a floating control can be understood as a view element, and displaying the floating control in the target interface can be understood as superimposing and displaying the view element on an upper layer of the target interface. The attributes of the floating control, such as shape, size, color, transparency and display position, can be set according to actual requirements. For example, the floating control can be a control in the form of floating frame. After displaying the floating control, the user can adjust the display position of the floating control by inputting a drag operation. Optionally, at least one border or at least two borders of the floating control coincide with the interface boundary of the target interface.

In the embodiment of the present disclosure, besides displaying the first content corresponding to the first user in the target interface, the floating control is also displayed in the target interface, and the shared media stream is displayed in the floating control, so that the first user can watch the user's own interface content and share the media stream at the same time.

FIG. 3 is a schematic interface provided by an embodiment of the present disclosure. As shown in FIG. 3, a first media stream is displayed in a target interface 301, and a floating control 302 is displayed in the target interface 301. Optionally, the floating control 302 is located in the upper left corner of the target interface 301, and the left border and the upper border of the floating control 302 coincide with the left border and the upper border of the target interface 301 respectively.

It should be noted that users who participate in the media stream shared interaction can also be understood as existing in the same shared space. If the first user creates the shared space and invites other users to join the shared space, it can be considered that there is no second user before other users join the shared space. The shared media stream can also be displayed in the floating control, and waiting for the second user to join in the playing process. In addition, when all the second users leave the shared space and only the first user is left in the shared space, the shared media stream can continue to be displayed in the floating control.

Step 202: displaying a preset control in the floating control, in which the preset control is configured to at least one of the following: displaying associated information of the shared interaction between the first user and the at least one second user or controlling the shared interaction between the first user and the at least one second user.

For example, the preset control can be resident in the floating control, and can also be displayed when the preset display conditions are met. Optionally, in the process of displaying the shared media stream, the control may not be displayed in the floating control, so as to reduce the interference of the control on the content of the shared media stream, so that the floating control can present a pure state. When the user wants to set the shared interaction, the user can input a trigger operation for the floating control, and the type of trigger operation is not limited, such as clicking or long pressing. After the user triggers the floating control, the preset control is displayed in the floating control. Optionally, when a message or notification is received, a preset control is displayed. The type, display position and quantity of preset controls can be set according to actual needs.

As shown in FIG. 3, a preset control 303 may be displayed in a lower right corner of the floating control.

For example, the preset control can be used to display the associated information of the shared interaction between the first user and at least one second user, and the associated information can include, for example, the user identifier of the user participating in the shared interaction, the interactive message sent by the user during the shared interaction, and the like. The preset control can also be used to control the shared interaction between the first user and at least one second user, that is, based on the control operation of the shared interaction input by the preset control, different controls can be set according to different control operations. For example, the preset controls can include at least one of the following: a shared user invitation control, a shared interface switching control, a floating control closing control, a shared media stream pause display control, a media content switching control in a shared media stream, a video picture control for real-time call, or a voice control for real-time call (such as a microphone switch control). Accordingly, the control operations input through the preset controls may include inviting the sharing user to operate, switching to the shared interface operation, closing the floating control operation, suspending displaying the sharing media stream, switching the previous media content or the next media content in the sharing media stream, and closing or opening the microphone switch operation of the real-time call, etc.

According to the information display method provided by the embodiment of the application, the first content corresponding to a first user is displayed in a target interface of a preset application program, the floating control is displayed in the target interface, and the shared media stream is displayed in the floating control, the shared media stream includes a media stream corresponding to a shared interaction between the first user and at least one second user, and a preset control is displayed in the floating control, the preset control is configured to display associated information of the shared interaction and/or controlling the shared interaction. By adopting the technical scheme, the first user can watch the first user's own interface content and the media stream shared with the second user in the application interface at the same time, and can directly control the shared interaction through the preset control in the floating control, or display the associated information of the shared interaction in the floating control, thereby improving the convenience of shared interaction.

In the embodiment of the present disclosure, the source of the shared media stream is not limited, and the first media stream is different from the shared media stream when the first content includes the first media stream. For example, the shared media stream can be set by the user who initiated the shared interaction; it can be determined according to the media stream corresponding to the user who initiated the shared interaction. For example, the shared media stream can be obtained by filtering the media stream corresponding to the user with preset filtering rules, which can include, for example, filtering graphic media content; it can also be determined according to the media streams corresponding to at least two users participating in the shared interaction, for example, the first media stream corresponding to the first user and the second media stream corresponding to the second user are merged to obtain the shared media stream.

Optionally, before displaying the shared media stream in the floating control, the method further comprises: generating a target determination mode according to a first determination mode of the first media stream corresponding to the first user and a second determination mode of a second media stream corresponding to the at least one second user; determining the shared media stream according to the target determination mode. This setting can determine the media streams of common interest to multiple users according to the target determination method and share the media streams. When the number of second users is at least two, the second determination method for generating the target determination method may include a second determination method corresponding to a single second user or at least two second users respectively.

For example, the first user is user A, and the second user includes user B and user C. User A initiates shared interaction, and the shared media stream can be determined in one of the following ways. For example, after filtering the media stream of user A, the shared media stream is obtained; for another example, the media streams corresponding to user A, user B and user C respectively are fused to obtain the shared media stream; for another example, the target recommendation algorithm is generated according to the media stream recommendation algorithms corresponding to user A, user B and user C respectively, and the shared media stream is determined according to the target recommendation algorithm.

In some embodiments, the associated information includes the conversation message generated by the shared interaction, and the displaying of the preset control in the floating control includes: displaying a first preset control in the floating control in response to receiving the conversation message of at least one second user among all the second users, wherein the first preset control is configured to display the user identifier of the at least one second user among all the second users and/or the conversation message. Illustratively, the conversation message may include at least one message in the form of text, voice or image. In this way, instant message interaction between the local user and the opposite user can be supported, and the conversation message can be displayed in the floating control, so that the local user can directly check all or part of the message content from the floating control without interface switching and other operations, which improves the convenience of message interaction. In addition, the display of the user identifier can help the local user to clearly identify the identity of the user who sent the message and improve the interaction efficiency. When the conference message is displayed, all or part of the message content can be displayed, which can be dynamically determined according to the string length of the message content and the display size of the floating control. User identifier can be user name, user nickname or user avatar, etc.

Optionally, a first preset control is displayed in the floating control for a first preset duration. For example, user identifiers and/or session messages corresponding to at least two users can be displayed in the floating control at the same time. The display form of the conversation message is not limited, for example, it can be displayed in the form of text bubbles. If the first preset control is used to display the user identifier of the second user, the session message can be displayed in an associated region outside the floating control that displays the shared media stream, such as above, below, left or right of the floating control, which can be dynamically determined according to the relative position of the floating control in the target interface, that is, another floating control that is separate from the floating control that displays the shared media stream can be used to display the associated information of shared interaction.

In some embodiments, the method further comprises: in response to the triggering operation of the first user for the session message, displaying a message interaction interface for the at least one second user among all the second users, wherein the message interaction interface is configured for the first user to interact with the at least one second user among all the second users. This arrangement is convenient for the first user to reply to the message of the second user. Optionally, the display priority of the floating control is higher than that of the message interaction interface, so that the viewing of the shared media stream by the first user will not be affected during the reply process.

For example, the display priority of the floating control is higher than that of the message interaction interface, which can be understood as the display of the message interaction interface will not block the display of the floating control, for example, the floating control is displayed on the upper layer of the message interaction interface. Optionally, the message interaction interface is located on the upper layer of the target interface, and the size of the message interaction interface can be less than or equal to the size of the target interface. The message interaction interface may include a return control, and the method may further include returning to the target interface in response to the trigger of the first user for the return control.

In some embodiments, displaying the preset control in the floating control includes displaying a second preset control in the floating control in response to a trigger operation of the first user on the floating control, and the second preset control is configured to control the shared interaction between the first user and the at least one second user.

In some embodiments, the second preset control includes a shared interface switching control, and after displaying the preset control in the floating control, the method further includes: in response to the trigger operation of the first user for the shared interface switching control, switching the target interface to a shared interface, and continuing to displaying the shared media stream in the shared interface; and the shared interface includes a floating control switching control, and the floating control switching control is configured to switch the shared interface to the floating control. This setting can support users to switch between shared interfaces and floating controls, so as to choose the current mode of watching shared media streams more flexibly.

For example, in the process of switching between the shared interface and the floating control, the display progress of the media content in the shared media stream can be unaffected, and the display size of the images in the media content can be adjusted to adapt to the size of the shared interface or the floating control.

In some embodiments, the method further includes detecting that the at least one second user among all the second users switches the shared interface of the second user side to a floating control by triggering the floating control switching control during the process of displaying the shared media stream in the shared interface, and keeping displaying the shared media stream in the shared interface. With this arrangement, when the opposite user switches the display mode of the shared media stream in the process of sharing the media stream, the influence on the local user side is reduced.

In some embodiments, the shared media stream includes images and sounds; the displaying of the shared media stream in the floating control includes displaying the images in the shared media stream in the floating control, and disabling playing the sounds in the shared media stream. Images in the first media stream are displayed in the target interface and sounds in the first media stream are played, that is, the first media stream can be displayed normally in the target interface. With this arrangement, when both the first media stream and the shared media stream contain sounds, it is possible to avoid mutual interference caused by playing the sounds in the two media streams at the same time. It should be noted that if the local user wants to hear the sound of the shared media stream, the local user can switch to the shared interface to show the shared media stream.

In some embodiments, the shared interaction supports real-time call between the first user and the at least one second user; the method further comprises the following steps: if the images in the shared media stream are displayed in the floating control, and the sounds in the shared media stream are disabled from being played, and in response to receiving the real-time call data of at least one second user among all the second users, playing the sound corresponding to the real-time call data. With this arrangement, in the process of sharing the media stream, the real-time voice communication between the local user and the opposite user can be supported, and the convenience of interaction between users can be improved. On the basis of disabling playing the voice in the shared media stream, the normal playing of the call voice can be ensured, and the smoothness of voice communication between users can be ensured.

In some embodiments, the shared interaction supports real-time call between the first user and the at least one second user; displaying the preset control in the floating control includes: in response to receiving the real-time call data of at least one second user among all the second users, displaying a third preset control in the floating control, wherein the third preset control is configured to display a user identifier corresponding to the at least one second user among all the second users and/or an image corresponding to the real-time call data of the at least one second user among all the second users. Real-time call data can help the local user to further clarify the identity of the currently speaking user and improve the interaction efficiency.

The image corresponding to the real-time call data can be, for example, a video picture of a video call. Optionally, a third preset control is displayed in the floating control for a second preset duration. For example, the second preset duration can be preset according to actual needs, such as 2 seconds, or can be set according to the playing duration corresponding to real-time call data. For example, if the speaking duration is 5 seconds, the second preset duration can also be 5 seconds. When the user identifier of the second user is displayed, the user identifier of the home user (that is, the speaking user) corresponding to the real-time call data can be displayed; it is also possible to display the user identities of all the second users. At this time, the user identities of the home users corresponding to the real-time call data can be displayed in a differentiated manner, so that the local users can clearly share all the participating users in the interaction and at the same time, clearly identify the users who are currently speaking. Differentiated display can be that the borders of user identifier (user identifier) are different or the display effects are different. For example, compared with the user identifier of non-home users, the user identifier of home users has bold borders and adds dynamic effects such as flickering.

In some embodiments, the process of displaying the shared media stream in the floating control further includes adjusting the size of the floating control according to the media content in the currently displayed shared media stream. This setting can make the size of the floating control better match the media content.

For example, the size of the floating control can be adjusted according to the image size of the media content in the currently displayed shared media stream, such as adjusting the aspect ratio (the ratio of wide and the high) of the floating control to that of the image. For example, if the aspect ratio of the image is 16:9, you can adjust the aspect ratio of the floating control to 16:9; if the aspect ratio of the image is 9:16, you can adjust the aspect ratio of the floating control to 9:16.

In some embodiments, the displaying of the preset control in the floating control includes displaying a fourth preset control in the floating control in response to a third user joining the shared interaction, wherein the fourth preset control is configured to display a user identifier corresponding to the third user. With this arrangement, when there is a newly joined user, the first user is informed of the joining of the new user by displaying the user identifier corresponding to the newly joined user, so as to reduce the interference to the viewing of the media stream.

Optionally, the user identifier corresponding to the third user is displayed in the floating control for a third preset duration. In addition, the user identifier corresponding to the second user can also be displayed for a fourth preset duration, so that when a new user joins, the first user can clearly and intuitively confirm all the participating users in the shared interaction. Optionally, when the user identifier of the third user and the user identifier of the second user are in the display state at the same time, the user identifier of the third user and the user identifier of the second user can be displayed differently to help the first user quickly determine the newly added user. For example, the third user can become a new second user after joining successfully.

In some embodiments, the method further includes: in response to the target user quitting the shared interaction, updating the shared media stream according to the determination method of the media stream of at least one user except the target user in the shared interaction. With this arrangement, when a user quits the shared interaction, the shared media stream can be updated in time to ensure that the shared media stream is more suitable for the retained users to watch. For the update method, please refer to the relevant description of the source of the shared media stream above, and the repeating part will not be repeated here in again. It should be noted that if the shared media stream is determined according to the media stream corresponding to the initiating user of the shared interaction, if the target user is the initiating user, a new shared media stream can be determined according to the media stream corresponding to the first user who accepts the invitation or any user other than the initiating user.

In some embodiments, the method further includes: in response to the trigger operation of the first user for the target user identifier in the floating control, determining whether the call image of the first user side and/or the call image of the second user side is opened under the condition that it is determined that the shared interaction is initiated in a video call scene, and if the call image of the first user side and/or the call image of the second user side is opened, switching the target interface to a video call interface, or, in response to the trigger operation of the first user for the target user identifier in the floating control, the floating control is switched to a video call mode, and the video call screen of the first user and/or the video call screen of the user corresponding to the target user identifier is included in the floating control in the video call mode. With this setting, if the sharing is initiated in the video call scene, a quick operation mode can be provided for viewing the video call picture.

For example, the video call interface includes the video call picture of the first user and/or the video call picture of the user corresponding to the target user identifier. When the target interface is switched to the video call interface, the floating control can be hidden, or the display of the floating control can be kept, that is, the display of the shared media stream can be kept, so that the first user can watch the shared media stream while watching the video call picture.

For example, the display of the first media stream in the target interface can be maintained while the floating control is switched to the video call mode, so that the first user can watch the first user's own media stream while viewing the video call screen.

Optionally, if it is determined that the shared interaction is not initiated in the video call scene, or it is determined that the call image of the first user side and/or the call image of the second user side are not opened, the current display mode of the target interface and the floating control can be maintained after receiving the trigger operation of the first user for the target user identifier in the floating control.

In some embodiments, the second preset control includes a floating control closing control, and after displaying the second preset control in the floating control, the method further includes: in response to the trigger operation of the first user to the floating control closing control, determining whether the shared interaction is initiated in a video call scene; if the shared interaction is initiated in the video call scene, the target interface is switched to a video call interface, the floating control is hidden, and a floating control return control is displayed in the video call interface; if the shared interaction is not initiated in the video call scene, closing the floating control. In this way, the function of the floating control closing control is reused, and when the control is triggered, it can respond in different ways according to the different initiation scenarios of the shared interaction. For the initiation scene of video call, the shared interaction can be maintained while switching to the video call interface, and the floating control return control can be provided. The floating control return control can be used to return to the target interface and display the floating control, and the shared interaction does not need to be initiated again, so as to meet the user's demand for fast switching between the video call interface and the floating control.

In some embodiments, displaying the shared media stream in the floating control includes: automatically and continuously playing at least two media contents in the shared media stream in the floating control in response to detecting that all second user sides corresponding to the at least one second user are displaying the shared media stream through the floating control. With this arrangement, when the first user watches the shared media stream in the floating control mode, if it is detected that other users participating in the shared interaction have entered the floating control mode, the media content in the shared media stream can be automatically and continuously played, and the operation of actively switching the shared content by the user is reduced. Optionally, the first user can switch the media content in the first media stream in the target interface.

In some embodiments, the method further includes: after switching from the target interface to a preset interface in the preset application, continuing to display the floating control in the preset interface and continuing to show the shared media stream in the floating control. With this arrangement, the display of the floating control can still be maintained during the interface switching process, so that the first user can watch the shared media stream while performing operations other than watching the first media stream in the preset application. Optionally, the preset interface can be all interfaces in the preset application except the target interface, so as to realize the global display of the floating control in the preset application.

In some embodiments, the floating control exists in the form of a custom view, a preset control is encapsulated in the custom view, and the shared media stream is displayed by a player started in the custom view. After switching from the target interface to the preset interface in the preset application program, continuing to display the floating control in the preset interface, and continuing to display the shared media stream in the floating control, including: removing the custom view from the target interface in response to the switching operation of switching the target interface to the first interface, and determining whether the first interface is in a preset white list, and determining that the first interface is in the preset white list if the first interface is in the preset white list; adding the custom view to the first interface, and continuously displaying the shared media stream by using the player. In this way, the floating control is realized by adding a custom view to the target interface. Compared with the picture-in-picture realization method in the related art, the floating control can have richer capabilities, can display more styles of controls, and improve the display effect and interactive effect. Moreover, by setting a white list, the interface that can display the floating control can be set more flexibly.

In some embodiments, the method further includes: after the preset application program is switched to the background running state, continuously displaying the floating control in the screen and continuously displaying the shared media stream in the floating control. With this arrangement, it is convenient for the first user to watch the shared media stream even if the preset application program is in the background.

Optionally, after continuously displaying the floating control in the screen, the method may further include: in response to the trigger operation of the first user for the floating control, switching the preset application to the foreground running state, and displaying the floating control in the preset application.

In some embodiments, after the preset application program is switched to the background running state, continuously displaying the floating control in the screen and continuously displaying the shared media stream in the floating control includes: detecting that the preset application program is switched to the background running state and starting the floating window service of the system; creating the floating window by using the floating window service, and adding the custom view in the floating window, wherein the size of the custom view matches the size of the floating control, and the custom view is configured to display the preset control; starting the player in the custom view, and displaying the shared media stream by using the player. This setting makes it possible to create a system-level floating window after the preset application is switched to the background running state, use the floating window as a container for the custom view, add the custom view to the floating window, and start the player in the custom view to continuously display the shared media stream.

Figure 4:
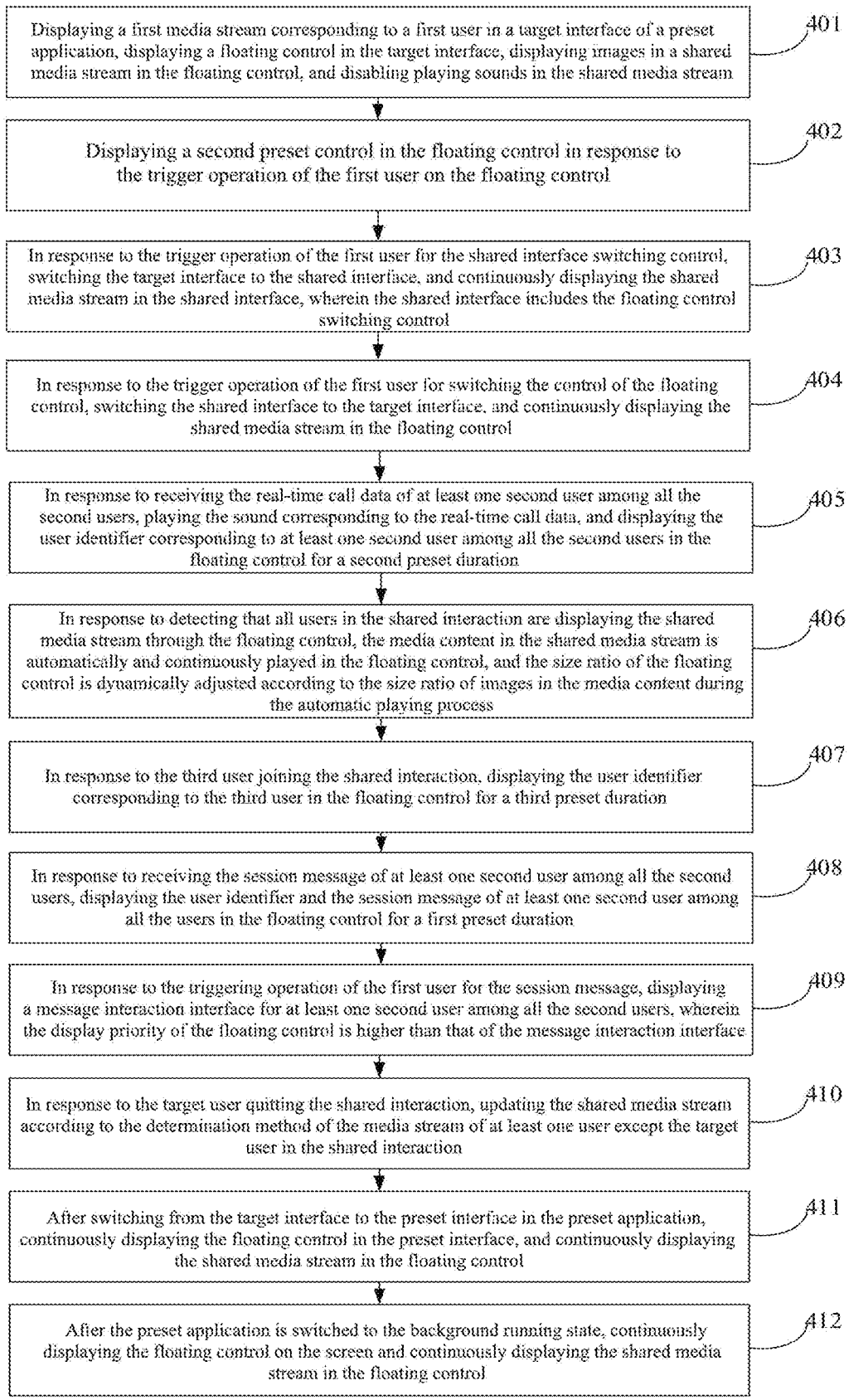
FIG. 4 is a flowchart of another information display method provided by an embodiment of the present disclosure.

FIG. 4 is a flowchart of another information display method provided by an embodiment of the present disclosure, which is described based on a plurality of alternative schemes in the above embodiment. The method comprises the following steps.

Step 401: displaying a first media stream corresponding to a first user in a target interface of a preset application, displaying a floating control in the target interface, displaying images in a shared media stream in the floating control, and disabling playing sounds in the shared media stream.

For example, in the preset application, various sharing initiation scenarios can be supported, and the interface for inputting shared initiation operation can be any interface supporting sharing initiation scenarios, including target interfaces and other interfaces, such as session interfaces.

For example, after an interface other than the target interface (which can be recorded as the second interface) receives the sharing initiation operation, it can be determined whether the second interface is in a preset white list, and the interfaces included in the preset white list are interfaces that allow the display of floating controls. If the second interface is in the preset white list, the floating controls can be displayed in the second interface, and if the second interface is not in the preset white list, the second interface can be switched to a shared interface, and the floating control switching controls can be displayed in the shared interface, which is convenient for users.

For example, the users can be invited when initiating the shared interaction, or the users can be invited after displaying the floating control. Optionally, when the shared interaction is initiated in the session interface, the session members corresponding to the session interface can be automatically invited to join the shared interaction. Assuming that the session members corresponding to the session interface include user A (the first user) and user B, when initiating shared interaction, user B can be automatically invited to join the shared space; assuming that the session members corresponding to the session interface include user A (the first user), user B and user C, when initiating the shared interaction, user B and user C can be automatically invited to join the shared space.

Optionally, after the first user initiates the shared interaction and before other users join the shared interaction, the shared media stream can be determined according to the first media stream corresponding to the first user. After the second user joins the shared interaction, a target determination mode can be generated according to the first determination mode of the first media stream and the second determination mode of the second media stream corresponding to the second user, and then the shared media stream can be determined according to the target determination mode.

For example, the floating control in the preset application exists in the form of a custom view, in which the preset control is encapsulated, and the shared media stream is displayed by a player started in the custom view. After initiating the shared interaction, a custom view can be created, the custom view can be added to the target interface, and the player is started in the custom view.

Optionally, at least two borders of the floating control coincide with the interface boundary of the current interface, so as to realize the visual effect that the floating control is attached to the interface boundary.

Figure 5:
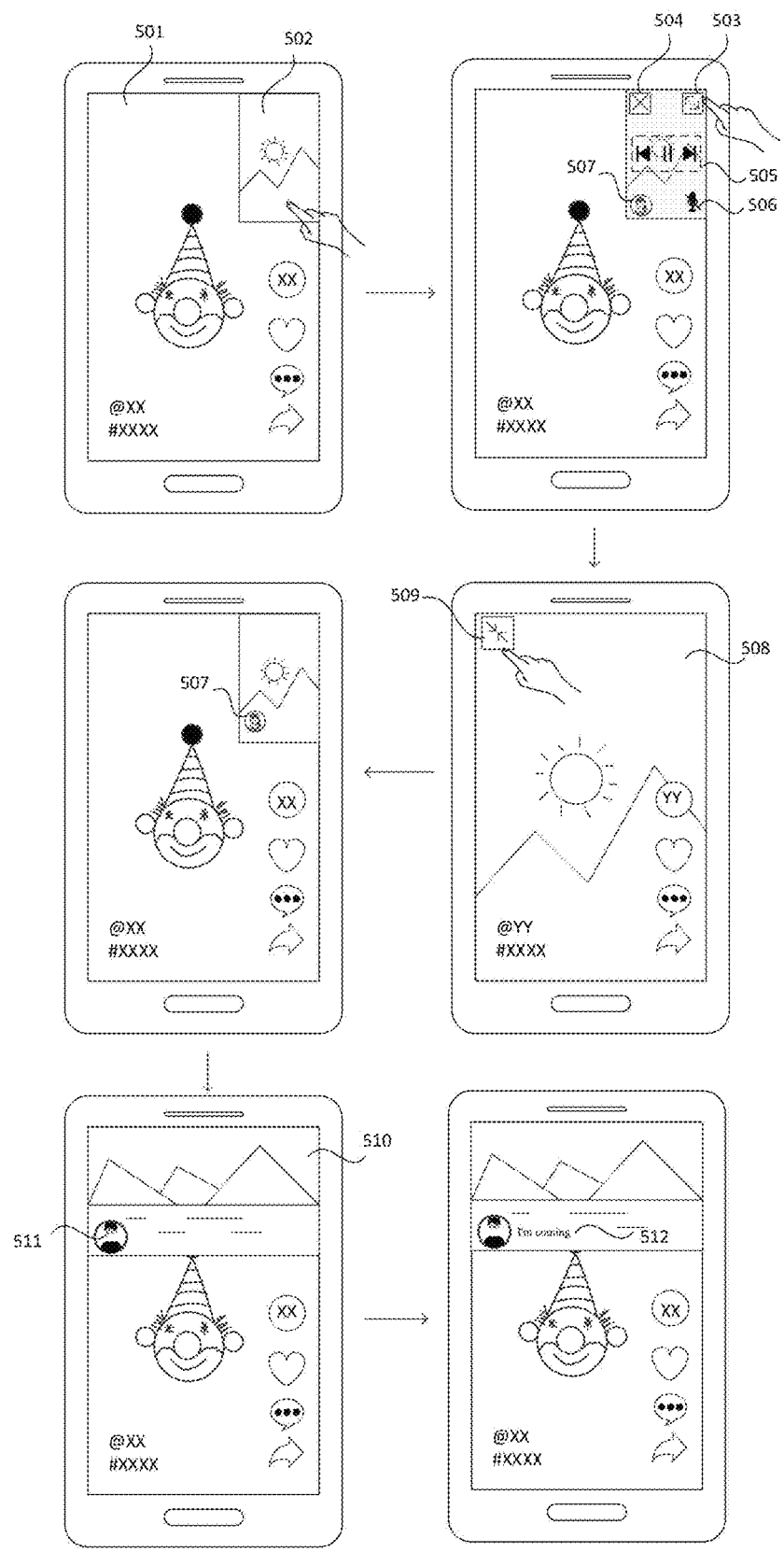
FIG. 5 is a schematic diagram of another interface interaction provided by an embodiment of the present disclosure.

FIG. 5 is another schematic diagram of interface interaction provided by an embodiment of the present disclosure, in which a floating control 502 is displayed in a target interface 501, and the floating control 502 is attached to the upper boundary and the right boundary of the target interface 501. The media content, including images and sounds, is played in the first media stream of user A in the target interface 501; the image of the media content in the shared media stream is played in the floating control 502.

Optionally, in response to the dragging operation of the first user on the floating control, the display position of the floating control is dynamically adjusted along with the dragging operation, the current position of the floating control is determined in response to the first user ending the dragging operation, and the display position of the floating control is determined in the target interface according to the current position. For example, the target interface is divided into a left region and a right region equally, and the target region where the coordinate points corresponding to the current position fall is determined. If the target region is the left region, the abscissa of the upper left corner point in the display position of the floating control is set as the abscissa of the upper left corner point of the target interface; if the target region is the right region, the abscissa of the upper left corner in the display position of the floating control is set as the abscissa of the upper left corner of the target interface plus the screen width and subtract the width of the floating control.

Step 402: displaying a second preset control in the floating control in response to the trigger operation of the first user on the floating control.

The second preset control is used to control the shared interaction between the first user and at least one second user, and the type and category of the second preset control displayed each time the floating control is triggered can be dynamically determined according to the current scene.

Assuming that a second user has joined the sharing at present, as shown in FIG. 5, after clicking the floating control 502, the local user can display a shared interface switching control 503, a floating control closing control 504, a shared media stream playing control 505 (which can include a pause display control and a media content switching control in the shared media stream, such as switching to the previous one and switching to the next one), and a microphone switch control 506 for real-time call, and also can display the user identifier 507 of the user B (the second user) participating in the shared interaction. Optionally, if there is no second user who has joined the shared interaction at present, the user identifier 507 can be replaced with a shared user invitation control. If the first user triggers the shared user invitation control, a user list can be displayed for the first user to select the user to be invited. Optionally, if sharing is initiated in a group session, the session members in the corresponding group can be displayed in the user list, and all friends of the first user can be displayed in the user list.

Optionally, if the first user triggers a preset control, all preset controls can be hidden; if the first user does not trigger the preset control within the specified time, all preset controls can also be hidden.

Step 403: in response to the trigger operation of the first user for the shared interface switching control, switching the target interface to the shared interface, and continuously displaying the shared media stream in the shared interface, wherein the shared interface includes the floating control switching control.

As shown in FIG. 5, assuming that user A clicks the shared interface switching control 503, then the target interface is switched to the shared interface 508, and the shared media stream is continuously displayed on the shared interface 508, and the shared interface 508 includes the floating control switching control 509.

Step 404: in response to the trigger operation of the first user for switching the control of the floating control, switching the shared interface to the target interface, and continuously displaying the shared media stream in the floating control.

As shown in FIG. 5, assuming that user A clicks the floating control switching control 509, the shared interface is switched to the target interface, and continuously displaying the shared media stream in the floating control.

Step 405: in response to receiving the real-time call data of at least one second user among all the second users, playing the sound corresponding to the real-time call data, and displaying the user identifier corresponding to at least one second user among all the second users in the floating control for a second preset duration.

For example, if a second user speaks to the first user through real-time voice while the first user is watching multiple media streams in the floating control mode, the local terminal will receive the real-time call data of the second user, and then play the voice corresponding to the real-time call data, and as shown in FIG. 5, the user identifier 507 corresponding to the user B can be displayed in the floating control, and the display duration can be a first preset duration, such as 2 seconds.

Step 406: in response to detecting that all users in the shared interaction are displaying the shared media stream through the floating control, the media content in the shared media stream is automatically and continuously played in the floating control, and the size ratio of the floating control is dynamically adjusted according to the size ratio of images in the media content during the automatic playing process.

As shown in FIG. 5, when the media content with a size ratio of 16:9 is automatically played, the size ratio of the floating control can be adaptively adjusted, and the floating control in portrait mode is switched to the floating control in landscape mode 510.

Step 407: in response to the third user joining the shared interaction, displaying the user identifier corresponding to the third user in the floating control for a third preset duration.

For example, assuming that the third user newly joins the shared interaction, as shown in FIG. 5, the user identifier 511 of user C (the third user) can be displayed in the floating control, for example, for 5 seconds, and the border of the user identifier can be bold and flashing. Subsequently, the user C becomes a member of the second user, that is, both the user B and the user C are regarded as second users at this time.

Step 408: in response to receiving the session message of at least one second user among all the second users, displaying the user identifier and the session message of at least one second user among all the users in the floating control for a first preset duration.

For example, as shown in FIG. 5, after the user C sends the session message "I'm coming", the user identifier of the user C and the session message 512 can be displayed in the floating control, for example, for 3 seconds.

Step 409: in response to the triggering operation of the first user for the session message, displaying a message interaction interface for at least one second user among all the second users, wherein the display priority of the floating control is higher than that of the message interaction interface.

Figure 6:
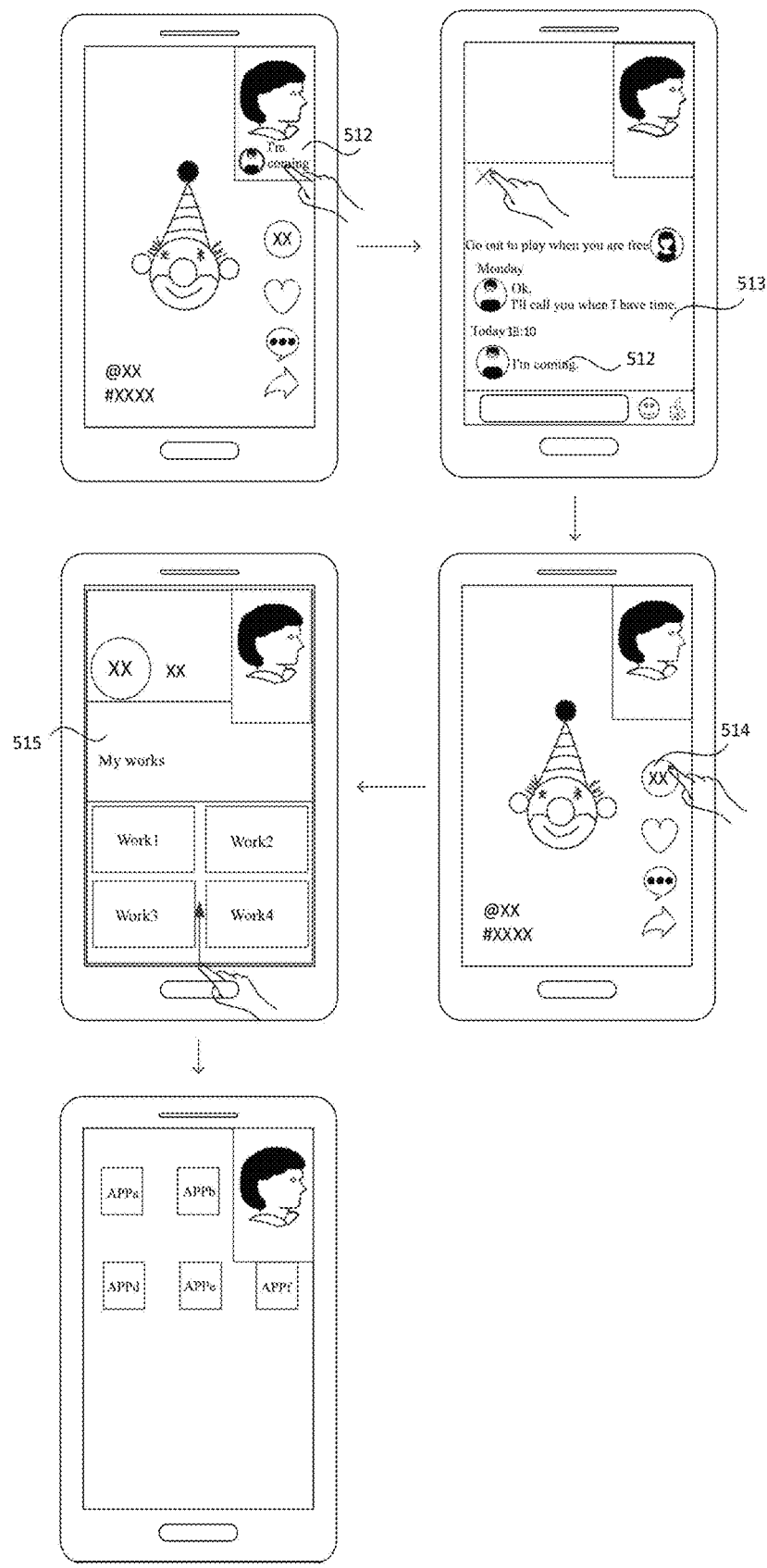
FIG. 6 is a schematic diagram of another interface interaction provided by an embodiment of the present disclosure.

FIG. 6 is a schematic diagram of another interface interaction provided by an embodiment of the present disclosure. For example, assuming that during the display of a conversation message 512, the shared media stream is automatically switched to the media content with a size ratio of 9:16, and the user A can automatically switch back to the vertical screen mode floating control. After clicking the conversation message 512, the message interaction interface 513 is displayed, and the floating control is displayed on the upper layer of the message interaction interface 513. The message interaction interface 513 can display the historical message records in the group conversations corresponding to the users A, B and C, and the conversation message 512 just sent by the user C. The user A can reply to the user C based on message interaction interface 513.

Step 410: in response to the target user quitting the shared interaction, updating the shared media stream according to the determination method of the media stream of at least one user except the target user in the shared interaction.

For example, assuming that the user B quits the shared interaction, the shared media stream can be re-determined according to the determination methods of the media streams corresponding to the user A and the user C respectively.

Step 411: after switching from the target interface to the preset interface in the preset application program, continuously displaying the floating control in the preset interface, and continuously displaying the shared media stream in the floating control.

For example, in response to the switching operation of switching the target interface to the first interface, the user-defined view is removed from the target interface, and it is determined whether the first interface is in the preset white list, and if the first interface is in the preset white list, it is determined that the first interface is the preset interface, and the first interface is displayed; a custom view is added to the first interface, and the shared media stream is continuously displayed with the player.

As shown in FIG. 6, assuming that the user A can continue to watch the user A's own media stream after closing the message interaction interface 513. Assuming that the user A is interested in the media content currently displayed in the target interface, and wants to know more about the media content publisher user XX, the user A can click on the avatar 514 of user XX (that is, input the switching operation to switch to the first interface), enter the personal homepage 515 (the first interface) of user XX, and remove the custom view from the target interface. If the personal homepage 515 is in the preset white list, the user A can add the custom view to the personal homepage 515, and continue to display the shared media stream by the player.

For example, the life cycle of an Activity in a preset application can be detected, one activity corresponds to a interface, and one activity can be a start function and an end function in the life cycle. When the end function corresponding to the activity of the target interface is detected to be called, it can be considered that the display of the target interface needs to be ended. When the start function corresponding to the activity of the first interface is detected to be called, it can be considered that the first interface needs to be displayed, and it can be considered that the switching operation of switching the target interface to the first interface is detected. At this time, it can be determined whether the first interface has the conditions for displaying the floating control, that is, whether the first interface is a preset interface, and whether there is an activity corresponding to the first interface in the white list of activities. If there is an activity corresponding to the first interface in the white list of activities, it can be explained that the first interface is a preset interface. Because the floating control already exists in the target interface and does not need to be created again, the custom view is removed from the target interface (for example, the remove view function can be called) and the custom view van be added in the first interface (for example, the addview function can be called). Optionally, if the first interface is not the default interface, the custom view can be destroyed and re-created when switching to the default interface.

Step 412: after the preset application is switched to the background running state, continuously displaying the floating control on the screen and continuously displaying the shared media stream in the floating control.

For example, as shown in FIG. 6, after the user A inputs the slide-up operation starting from the bottom edge of the screen, the preset application can be switched to the background running state. At this time, the desktop interface is displayed on the screen, and the icon of the application is displayed in the interface, so that the floating control can continue to be displayed on the screen, which is convenient for user A to continue watching the shared media stream.

Illustratively, it is detected that the preset application program is switched to the background running state, the suspended window service of the system is started, the suspended window is created by using the suspended window service, and a custom view is added in the suspended window, the size of the custom view matches the size of the suspended control, the preset control is encapsulated in the custom view, the player is started in the custom view, and the shared media stream is continuously displayed by using the player.

Figure 7:
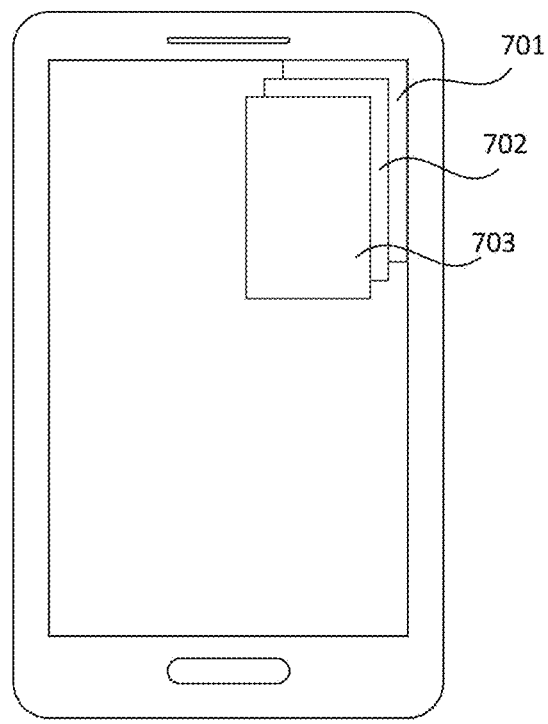
FIG. 7 is a schematic structural diagram of a floating control provided by an embodiment of the present disclosure.

For example, FIG. 7 is a schematic structural diagram of a floating control provided by the embodiment of the present disclosure. As shown in FIG. 7, the floating control displayed outside the preset application program can include a three-layer structure, the lowest layer is a system-level floating window 701, the middle layer is a custom view 702, and the top layer is a player layer 703. The custom view 702 can be understood as a container of the player layer 703, and the system-level floating window 701 can be understood as a container of a custom view 702.

For example, after the preset application is switched to the background running state, the suspended window service of the system can be started (the service can be a foreground service or a background service, which can be determined according to the operating system version of the electronic device), and after the service is started, it can be considered as authorized by the system, and a suspended window can be created (for example, it can include initializing the suspended window and configuring relevant parameters of the suspended window, etc.), and a custom view can be added to the suspended window. A drag event can be added to make the floating control support dragging, the shared media stream can be got through the custom view, the player is started, the view corresponding to the player is added to the custom view, the size of the floating control is determined according to the size of the media content in the shared media stream, the floating control is displayed, and the media content in the shared media stream is played through the player. Optionally, after the floating control is triggered, the preset application can be started or switched to the foreground running state, and whether to continue displaying the floating control in the interface is determined according to whether the interface after entering the preset application is the preset interface.

According to the information display method provided by the embodiment of the present disclosure, a first user can watch first user's own media stream and the media stream shared with a second user at the same time in the application program interface, and the voice of the shared media stream in the floating control is not played, but the voice of the opposite end is played, so that voice communication can be smoothly carried out while reducing the interference of the voice of the shared media stream on first user own media stream, and meanwhile, the user can directly set the shared interaction through the preset control in the floating control. The convenience of sharing settings is improved, and relevant information such as conversation messages of newly added users and opposite users can be displayed in the floating control, which further improves the convenience of interaction. In the case of switching to the preset interface or switching the preset application to the background, the shared media stream can still be displayed in the floating control mode, which meets the needs of users to watch the shared media stream in different scenarios.

Figure 8:
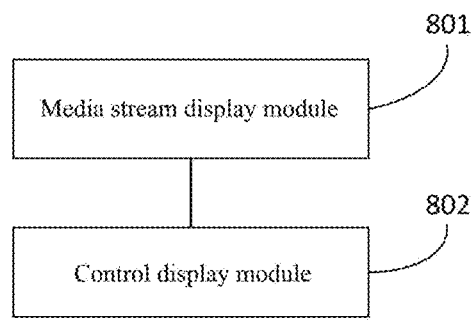
FIG. 8 is a schematic structural diagram of an information display apparatus provided by an embodiment of the present disclosure.

FIG. 8 is a schematic structural diagram of an information display apparatus provided by an embodiment of the present disclosure, which is configured at a first user side. As shown in FIG. 8, the apparatus includes a media stream display module 801 and a control display module 802.

A media stream display module 801, configured to display a first content corresponding to a first user in a target interface of a preset application program, display a floating control in the target interface, and display a shared media stream in the floating control, wherein the shared media stream comprises a media stream corresponding to a shared interaction between the first user and at least one second user; the control display module 802 is configured to display a preset control in the floating control, wherein the preset control is configured to at least one of the following: displaying associated information of the shared interaction between the first user and the at least one second user or controlling the shared interaction between the first user and the at least one second user.

The information display apparatus provided by the embodiment of the present disclosure displays the first content corresponding to a first user in a target interface of a preset application, displays a floating control in the target interface, and displays a shared media stream in the floating control, wherein the shared media stream includes a media stream corresponding to a shared interaction between the first user and at least one second user, and displays a preset control in the floating control, wherein the preset control is configured to display associated information of the shared interaction and/or controlling the shared interaction. By adopting the technical scheme, the first user can watch the first user's own interface content and the media stream shared with the second user in the application interface at the same time, and can directly control the shared interaction through the preset control in the floating control, or display the associated information of the shared interaction in the floating control, thereby improving the convenience of shared interaction.

Optionally, the associated information includes the conversation message generated by the shared interaction, and the control display module 802 is configured to display a first preset control in the floating control in response to receiving the conversation message of at least one second user among all the second users, wherein the first preset control is used to display the user identifier of the at least one second user among all the second users and/or the conversation message.

Optionally, the apparatus further comprises a message interaction interface display module, which is configured to display a message interaction interface for the at least one second user among all second users in response to a triggering operation of the first user for the session message, wherein the message interaction interface is configured for the first user to interact with the at least one second user among all second users in the message interaction.

Optionally, the message interaction interface is located on the upper layer of the target interface, and the size of the message interaction interface is less than or equal to the size of the target interface.

Optionally, the first content includes a first media stream, which is different from the shared media stream.

Optionally, the control display module 802 is configured to display a second preset control in the floating control in response to a trigger operation of the first user on the floating control, wherein the second preset control is configured to control the shared interaction between the first user and the at least one second user.

Optionally, the second preset control comprises a shared interface switching control, and the apparatus further comprises: after displaying the second preset control in the floating control, in response to the trigger operation of the first user for the shared interface switching control, switch the target interface to a shared interface, and continuously display the shared media stream in the shared interface, wherein the shared interface comprises a floating control switching control, and the floating control switching control is configured to switch the shared interface to a floating control.

Optionally, the apparatus further comprises a second switching module, which is configured to detect that at least one second user among all second users switches the shared interface of the second user side to a floating control by triggering the floating control switching control in the process of displaying the shared media stream in the shared interface, and keep display the shared media stream in the shared interface.

Optionally, the shared media stream includes images and sounds; the displaying a shared media stream in the floating control comprises: displaying images in the shared media stream in the floating control, and disabling playing sounds in the shared media stream.

Optionally, the shared interaction supports real-time call between the first user and the at least one second user; the apparatus also comprises a call sound playing module, which is configured to if the images in the shared media stream are displayed in the floating control, and the sounds in the shared media stream are disabled from being played, play sounds corresponding to real-time call data in response to receiving the real-time call data of at least one second user among all the second users.

Optionally, the shared interaction supports real-time call between the first user and the at least one second user; the control display module 802 is configured to display a third preset control in the floating control in response to receiving the real-time call data of at least one second user among all second users, wherein the third preset control is used to display the user identifier corresponding to the at least one second user among all second users and/or the image corresponding to the real-time call data of the at least one second user among all second users.

Optionally, the apparatus further comprises a target determination mode generation module configured to generate a target determination mode according to a first determination mode of a first media stream corresponding to the first user and a second determination mode of a second media stream corresponding to the second user before the shared media stream is displayed in the floating control; a shared media stream determination module configured to determine the shared media stream according to the target determination mode.

Optionally, the apparatus further comprises a size adjustment module, which is configured to adjust the size of the floating control according to the media content in the currently displayed shared media stream in the process of displaying the shared media stream in the floating control.

Optionally, the control display module 802 is configured to display a fourth preset control in the floating control in response to the third user joining the shared interaction, wherein the fourth preset control is used to display the user identifier corresponding to the third user.

Optionally, the apparatus further comprises a shared media stream updating module, which is configured to update the shared media stream according to the determination mode of the media stream of at least one user except the target user in the shared interaction in response to the target user quitting the shared interaction.

Optionally, the apparatus further comprises a third switching module, which is configured to respond to the trigger operation of the first user for the target user identifier in the floating control, determine whether the call image of the first user side and/or the call image of the second user side is opened under the condition that it is determined that the shared interaction is initiated in the video call scene, and switch the target interface to the video call interface if the call image of the first user side and/or the call image of the second user side is opened, Or, in response to the trigger operation of the first user for the target user identifier in the floating control, the floating control is switched to a video call mode, wherein the video call screen of the first user and/or the video call screen of the user corresponding to the target user identifier is included in the floating control in the video call mode.

Optionally, the second preset control comprises a floating control closing control, and the apparatus further comprises a judgment module, which is configured to in response to the trigger operation of the first user to close the floating control after displaying the second preset control in the floating control, determine whether the shared interaction is initiated in a video call scene; a floating control hiding module is configured to switch the target interface to the video call interface, hide the floating control, and display the floating control return control in the video call interface under the condition that the shared interaction is initiated in the video call scene; a suspension control closing module is configured to close the suspension control under the condition that the shared interaction is not initiated in the video call scene.

Optionally, the second preset control includes at least one of the following: a shared user invitation control, a shared interface switching control, a media content switching control in a shared media stream, a video picture control for real-time call, or a voice control for real-time call.

Optionally, displaying the shared media stream in the floating control includes automatically and continuously playing at least two media contents in the shared media stream in the floating control in response to detecting that all the second user sides corresponding to the at least one second user display the shared media stream through the floating control.

Optionally, the apparatus further comprises a first display module, configured to continuously display the floating control in the preset interface and continuously display the shared media stream in the floating control after switching from the target interface to the preset interface in the preset application.

Optionally, the floating control exists in the form of a custom view, the preset control is encapsulated in the custom view, and the shared media stream is displayed through a player started in the custom view; the first display module is configured to remove the custom view from the target interface in response to the switching operation of switching the target interface to the first interface, and determine whether the first interface is in a preset white list, and if the first interface is in a preset white list, determine that the first interface is a preset interface and display the first interface; and add the custom view to the first interface, and continuously display the shared media stream by using the player.

Optionally, the apparatus further comprises a second display module, which is configured to continuously display the floating control in the screen and continuously display the shared media stream in the floating control after the preset application program is switched to the background running state.

Optionally, the second display module is configured to detect that the preset application program is switched to the background running state and start the suspended window service of the system; establish a suspended window by using the suspended window service, and add a custom view in the suspended window, wherein the size of the custom view matches the size of the suspended control, and the preset control is encapsulated in the custom view; and start a player in the custom view, and continuously display the shared media stream by using the player.

The information display apparatus provided by the embodiment of the present disclosure can execute the information display method provided by any embodiment of the present disclosure, and has functional modules corresponding to the execution method.

It is worth noting that the units and modules included in the above apparatus are only divided according to functional logic, but they are not limited to the above division, as long as the corresponding functions can be realized; In addition, the names of multiple functional units are only for the convenience of distinguishing each other, and are not used to limit the protection scope of the embodiment of the present disclosure.

Figure 9:
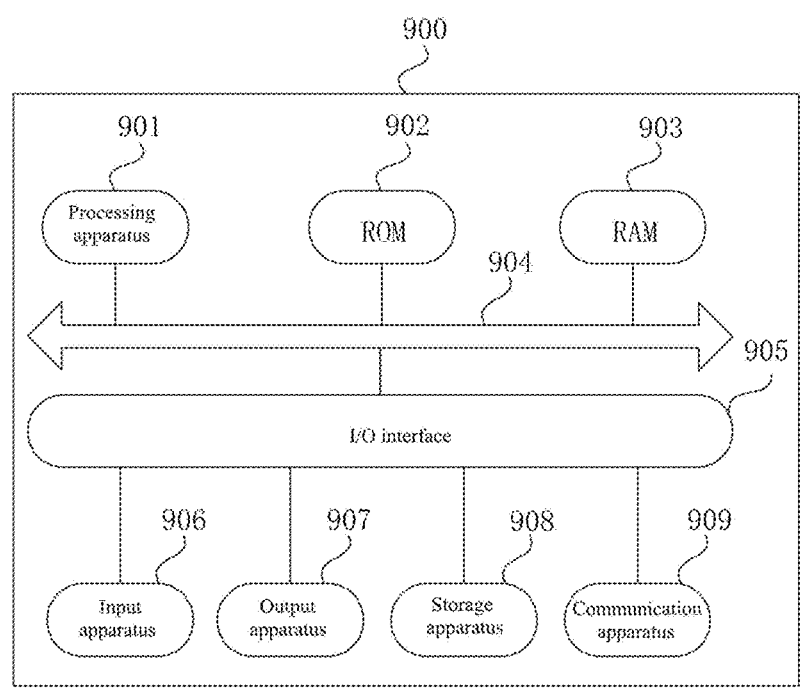
FIG. 9 is a schematic structural diagram of an electronic device provided by an embodiment of the present disclosure.

FIG. 9 is a schematic structural diagram of an electronic device provided by an embodiment of the present disclosure. FIG. 9 is referred below, and it shows the structure schematic diagram suitable for achieving the electronic device (such as a terminal device or a server in FIG. 9) 900 in the embodiment of the present disclosure. The terminal device in the embodiment of the present disclosure may include but not be limited to a mobile terminal such as a mobile phone, a notebook computer, a digital broadcasting receiver, a personal digital assistant (PDA), a PAD (tablet computer), a portable multimedia player (PMP), a vehicle terminal (such as a vehicle navigation terminal), and a fixed terminal such as a digital television (TV) and a desktop computer. The electronic device shown in FIG. 9 is only an example and should not impose any limitations on the functions and use scopes of the embodiments of the present disclosure.

As shown in FIG. 9, the electronic device 900 may include a processing apparatus (such as a central processing unit, and a graphics processor) 901, it may execute various appropriate actions and processes according to a program stored in a read-only memory (ROM) 902 or a program loaded from a storage apparatus 908 to a random access memory (RAM) 903. In RAM 903, various programs and data required for operations of the electronic device 900 are also stored. The processing apparatus 901, ROM 902, and RAM 903 are connected to each other by a bus 904. An input/output (I/O) interface 905 is also connected to the bus 904.

Typically, the following apparatuses may be connected to the I/O interface 905: an input apparatus 906 such as a touch screen, a touchpad, a keyboard, a mouse, a camera, a microphone, an accelerometer, and a gyroscope; an output apparatus 907 such as a liquid crystal display (LCD), a loudspeaker, and a vibrator; a storage apparatus 908 such as a magnetic tape, and a hard disk drive; and a communication apparatus 909. The communication apparatus 909 may allow the electronic device 00 to wireless-communicate or wire-communicate with other devices so as to exchange data. Although FIG. 9 shows the electronic device 900 with various apparatuses, it should be understood that it is not required to implement or possess all the apparatuses shown. Alternatively, it may implement or possess the more or less apparatuses.

According to the embodiment of the present disclosure, the process described above with reference to the flow diagram may be achieved as a computer software program. For example, an embodiment of the present disclosure includes a computer program product, it includes a computer program loaded on a non-transient computer-readable medium, and the computer program contains a program code for executing the method shown in the flow diagram. In such an embodiment, the computer program may be downloaded and installed from the network by the communication apparatus 909, or installed from the storage apparatus 908, or installed from ROM 902. When the computer program is executed by the processing apparatus 901, the above functions defined in the embodiments of the present disclosure are executed.

Names of messages or information exchanged among multiple devices in the embodiment of the present disclosure are only used for illustrative purposes, and are not used to limit the scope of these messages or information.

The electronic device provided by the embodiment of the present disclosure belongs to the same inventive concept as the information display method provided by the above embodiment, and the technical details not described in detail in this embodiment can be found in the above embodiment.

An embodiment of the present disclosure provides a computer storage medium on which a computer program is stored, which, when executed by a processor, realizes the information display method provided in the above embodiment.

It should be noted that the above computer-readable medium in the present disclosure may be a computer-readable signal medium, a computer-readable storage medium, or any combinations of the two. The computer-readable storage medium may be, for example, but not limited to, a system, an apparatus or a device of electricity, magnetism, light, electromagnetism, infrared, or semiconductor, or any combinations of the above. More specific examples of the computer-readable storage medium may include but not be limited to: an electric connector with one or more wires, a portable computer magnetic disk, a hard disk drive, a random access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combinations of the above. In the present disclosure, the computer-readable storage medium may be any visible medium that contains or stores a program, and the program may be used by an instruction executive system, apparatus or device or used in combination with it. In the present disclosure, the computer-readable signal medium may include a data signal propagated in a baseband or as a part of a carrier wave, it carries the computer-readable program code. The data signal propagated in this way may adopt various forms, including but not limited to an electromagnetic signal, an optical signal, or any suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including but not limited to: a wire, an optical cable, a radio frequency (RF) or the like, or any suitable combinations of the above.

In some implementation modes, a client and a server may be communicated by using any currently known or future-developed network protocols such as a HyperText Transfer Protocol (HTTP), and may interconnect with any form or medium of digital data communication (such as a communication network). Examples of the communication network include a local area network ("LAN"), a wide area network ("WAN"), an internet work (such as the Internet), and an end-to-end network (such as an ad hoc end-to-end network), as well as any currently known or future-developed networks.

The computer-readable medium may be included in the electronic device; or it can exist alone without being assembled into the electronic device.

The computer-readable medium carries one or more programs, and when the one or more programs are executed by the electronic device, the electronic device can: display a first content corresponding to a first user in a target interface of a preset application program, display a floating control in the target interface, and display a shared media stream in the floating control, wherein the shared media stream comprises a media stream corresponding to a shared interaction between the first user and at least one second user; display a preset control in the floating control, wherein the preset control is configured to at least one of the following: displaying associated information of the shared interaction between the first user and the at least one second user or controlling the shared interaction between the first user and the at least one second user.

The computer program code for executing the operation of the present disclosure may be written in one or more programming languages or combinations thereof, the above programming language includes but is not limited to object-oriented programming languages such as Java, Smalltalk, and C++, and also includes conventional procedural programming languages such as a "C" language or a similar programming language. The program code may be completely executed on the user's computer, partially executed on the user's computer, executed as a standalone software package, partially executed on the user's computer and partially executed on a remote computer, or completely executed on the remote computer or server. In the case involving the remote computer, the remote computer may be connected to the user's computer by any types of networks, including LAN or WAN, or may be connected to an external computer (such as connected by using an internet service provider through the Internet).

The flow diagrams and the block diagrams in the drawings show possibly achieved system architectures, functions, and operations of systems, methods, and computer program products according to various embodiments of the present disclosure. At this point, each box in the flow diagram or the block diagram may represent a module, a program segment, or a part of a code, the module, the program segment, or a part of the code contains one or more executable instructions for achieving the specified logical functions. It should also be noted that in some alternative implementations, the function indicated in the box may also occur in a different order from those indicated in the drawings. For example, two consecutively represented boxes may actually be executed basically in parallel, and sometimes it may also be executed in an opposite order, this depends on the function involved. It should also be noted that each box in the block diagram and/or the flow diagram, as well as combinations of the boxes in the block diagram and/or the flow diagram, may be achieved by using a dedicated hardware-based system that performs the specified function or operation, or may be achieved by using combinations of dedicated hardware and computer instructions.

The involved units described in the embodiments of the present disclosure may be achieved by a mode of software, or may be achieved by a mode of hardware. Herein, the name of the unit does not constitute a limitation for the unit itself in some cases. For example, the media stream display module can also be described as "a module that displays the first content corresponding to a first user in a target interface of a preset application, displays a floating control in the target interface, and displays a shared media stream in the floating control, wherein the shared media stream includes a media stream corresponding to the shared interaction between the first user and at least one second user".

The functions described above in this article may be at least partially executed by one or more hardware logic components. For example, non-limiting exemplary types of the hardware logic component that may be used include: a field programmable gate array (FPGA), an application specific integrated circuit (ASIC), an application specific standard product (ASSP), a system on chip (SOC), a complex programmable logic device (CPLD) and the like.

In the context of the present disclosure, the machine-readable medium may be a visible medium, and it may contain or store a program for use by or in combination with an instruction executive system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combinations of the above. More specific examples of the machine-readable storage medium may include an electric connector based on one or more wires, a portable computer disk, a hard disk drive, RAM, ROM, EPROM (or a flash memory), an optical fiber, CD-ROM, an optical storage device, a magnetic storage device, or any suitable combinations of the above.

According to one or more embodiments of the present disclosure, an information display method is provided, which is applied to a first user side, and includes: displaying a first content corresponding to a first user in a target interface of a preset application program, displaying a floating control in the target interface, and displaying a shared media stream in the floating control, wherein the shared media stream comprises a media stream corresponding to a shared interaction between the first user and at least one second user; and displaying a preset control in the floating control, wherein the preset control is configured to at least one of the following: displaying associated information of the shared interaction between the first user and the at least one second user or controlling the shared interaction between the first user and the at least one second user.

According to one or more embodiments of the present disclosure, the associated information comprises a conversation message generated by the shared interaction, and the displaying a preset control in the floating control comprises: in response to receiving a session message of at least one second user among all second users, displaying a first preset control in the floating control, wherein the first preset control is configured to display at least one of the following: a user identifier of the at least one second user among all second users or the session message.

According to one or more embodiments of the present disclosure, the method further comprises: displaying a message interaction interface for the at least one second user among all second users in response to a triggering operation of the first user for the session message, wherein the message interaction interface is configured for the first user to interact with the at least one second user among all second users in the message interaction.

According to one or more embodiments of the present disclosure, the message interaction interface is located at an upper layer of the target interface, and a size of the message interaction interface is less than or equal to a size of the target interface.

According to one or more embodiments of the present disclosure, the first content comprises a first media stream, which is different from the shared media stream.

According to one or more embodiments of the present disclosure, the displaying a preset control in the floating control comprises: displaying a second preset control in the floating control in response to a trigger operation of the first user on the floating control, wherein the second preset control is configured to control the shared interaction between the first user and the at least one second user.

According to one or more embodiments of the present disclosure, the shared media stream comprises images and sounds; and the displaying a shared media stream in the floating control comprises: displaying images in the shared media stream in the floating control, and disabling playing sounds in the shared media stream.

According to one or more embodiments of the present disclosure, the shared interaction supports real-time call between the first user and the at least one second user; the method further comprises the following steps: if the images in the shared media stream are displayed in the floating control, and the sounds in the shared media stream are disabled from being played, playing sounds corresponding to real-time call data in response to receiving the real-time call data of at least one second user among all the second users.

According to one or more embodiments of the present disclosure, the shared interaction supports real-time call between the first user and the at least one second user; the displaying of the preset control in the floating control includes: in response to receiving the real-time call data of at least one second user among all second users, displaying a third preset control in the floating control, wherein the third preset control is configured to display at least one of the following: a user identifier corresponding to the at least one second user among all second users or an image corresponding to the real-time call data of the at least one second user among all second users.

According to one or more embodiments of the present disclosure, before displaying the shared media stream in the floating control, the method further comprises: generating a target determination mode according to a first determination mode of the first media stream corresponding to the first user and a second determination mode of a second media stream corresponding to the at least one second user; determining the shared media stream according to the target determination mode.

According to one or more embodiments of the present disclosure, in the process of displaying the shared media stream in the floating control, the method further comprises adjusting a size of the floating control according to a media content in the shared media stream which is currently displayed.

According to one or more embodiments of the present disclosure, the displaying a preset control in the floating control comprises: in response to a third user joining the shared interaction, displaying a fourth preset control in the floating control, wherein the fourth preset control is configured to display a user identifier corresponding to the third user.

According to one or more embodiments of the present disclosure, the method further comprises: in response to the target user quitting the shared interaction, updating the shared media stream according to a determination method of the media stream of at least one user except the target user in the shared interaction.

According to one or more embodiments of the present disclosure, the method further comprises: in response to a trigger operation of the first user for a target user identifier in the floating control, if it is determined that the shared interaction is initiated in a video call scene, determining whether at least one of a call image at the first user side and a call image at the second user side is turned on, and switching the target interface to a video call interface in response to a determination result that at least one of the call image at the first user side and the call image at the second user side is turned on; or, in response to the trigger operation of the first user for the target user identifier in the floating control, switching the floating control to a video call mode, wherein in the video call mode, the floating control comprises at least one of a video call picture of the first user and a video call picture of a user corresponding to the target user identifier.

According to one or more embodiments of the present disclosure, the second preset control comprises a floating control closing control, and after displaying the second preset control in the floating control, the method further comprises: determining whether the shared interaction is initiated in a video call scene in response to a trigger operation of the first user to the floating control closing control; in response to a determination result that the shared interaction is initiated in the video call scene, switching the target interface to a video call interface, hiding the floating control, and displaying the floating control return control in the video call interface; closing the floating control in response to a determination result that the shared interaction is not initiated in the video call scene.

According to one or more embodiments of the present disclosure, the second preset control comprises at least one of the following: a shared user invitation control, a shared interface switching control, a media content switching control in the shared media stream, a video picture control for real-time call or a voice control for real-time call.

According to one or more embodiments of the present disclosure, the method further comprises: after switching from the target interface to a preset interface in the preset application program, continuously displaying the floating control in the preset interface, and continuously displaying the shared media stream in the floating control.

According to one or more embodiments of the present disclosure, the floating control exists in a form of a custom view, a preset control is encapsulated in the custom view, and the shared media stream is displayed by a player started in the custom view; the after switching from the target interface to a preset interface in the preset application program, continuously displaying the floating control in the preset interface, and continuously displaying the shared media stream in the floating control, comprises: removing the custom view from the target interface in response to a switching operation of switching the target interface to the first interface, determining whether the first interface is in a preset white list, determining that the first interface is the preset interface in response to a determination result that the first interface is in the preset white list, and displaying the first interface; adding the custom view to the first interface, and continuously displaying the shared media stream by using the player.

According to one or more embodiments of the present disclosure, an information display apparatus is provided, which is configured at a first user side, and the information display apparatus includes a media stream display module, configured to display a first content corresponding to a first user in a target interface of a preset application program, display a floating control in the target interface, and display a shared media stream in the floating control, wherein the shared media stream comprises a media stream corresponding to a shared interaction between the first user and at least one second user; a control display module, configured to display a preset control in the floating control, wherein the preset control is configured to at least one of the following: displaying associated information of the shared interaction between the first user and the at least one second user and controlling the shared interaction between the first user or the at least one second user.

According to one or more embodiments of the present disclosure, an electronic device is provided, which includes one or more processors; storage apparatus configured to store one or more programs, and when the one or more programs are executed by the one or more processors, the one or more processors realize the information display method provided by the embodiment of the present disclosure.

According to one or more embodiments of the present disclosure, a storage medium is provided, which includes computer-executable instructions, which, when executed by a computer processor, are used to perform the information display method provided by the embodiments of the present disclosure.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

The invention claimed is:

1. A shared media stream display method applied to a first user side, comprising:
   triggering to determine a shared media stream comprising a plurality of media contents in response to a media stream sharing operation, wherein the shared media stream is provided for a shared interaction between a first user and at least one second user;
   displaying a first content corresponding to the first user in a first interface of a preset application program, displaying a floating control in the first interface, and displaying the shared media stream in the floating control, wherein two adjacent media contents in the shared media stream are configured for at least one of automatic switching or manual switching; and
   displaying a control in the floating control, wherein the control is configured to at least one of the following: displaying associated information of the shared interaction between the first user and the at least one second user or controlling the shared interaction between the first user and the at least one second user;
   wherein the displaying a control in the floating control comprises:
   displaying a session message generated in the shared interaction in the floating control, wherein the session message comprises characters, and the characters are displayed upon an image of the shared media stream in the floating control;
   displaying a second control in the floating control in response to a trigger operation of the first user on the floating control, wherein the second control is configured to control the shared interaction between the first user and the at least one second user,
   wherein the method further comprises:
   in response to a trigger operation of the first user to a floating control closing control and determining that the shared interaction is initiated in a video call scene, switching the first interface to a video call interface, hiding the floating control, and displaying, in the video call interface, a return control configured to return to the first interface and display the floating control.

2. The method according to claim 1, wherein the associated information comprises a session message generated by the shared interaction, and the displaying a control in the floating control comprises:
   in response to receiving a session message of at least one second user among all second users, displaying a first control in the floating control, wherein the first control is configured to displaying at least one of the following: a user identifier of the at least one second user among all second users or the session message.

3. The method according to claim 2, further comprising:
   displaying a message interaction interface for the at least one second user among all second users in response to a triggering operation of the first user for the session message, wherein the message interaction interface is configured for the first user to interact with the at least one second user among all second users in the message interaction.

4. The method according to claim 3, wherein the message interaction interface is located at an upper layer of the first interface, and a size of the message interaction interface is less than or equal to a size of the first interface.

5. The method according to claim 1, wherein the first content comprises a first media stream, which is different from the shared media stream.

6. The method according to claim 5, wherein the shared media stream comprises images and sounds; and the displaying a shared media stream in the floating control comprises:

displaying images in the shared media stream in the floating control, and disabling playing sounds in the shared media stream.

7. The method according to claim 6, wherein the shared interaction supports real-time call between the first user and the at least one second user; and the method further comprises:
when the images in the shared media stream are displayed in the floating control, and the sounds in the shared media stream are prohibited from being played, playing sounds corresponding to real-time call data in response to receiving the real-time call data of at least one second user among all the second users.

8. The method according to claim 5, before displaying the shared media stream in the floating control, further comprising:
generating a third determination mode according to a first determination mode of the first media stream corresponding to the first user and a second determination mode of a second media stream corresponding to the at least one second user;
determining the shared media stream according to the third target determination mode.

9. The method according to claim 5, further comprising:
in response to a user quitting the shared interaction, updating the shared media stream according to a determination method of the media stream of at least one user except the user in the shared interaction.

10. The method according to claim 1, wherein the shared interaction supports a real-time call between the first user and the at least one second user; the displaying of the control in the floating control comprise:
in response to receiving real-time call data of at least one second user among all second users, displaying a third control in the floating control, wherein the third control is configured to display at least one of the following: a user identifier corresponding to the at least one second user among all second users or an image corresponding to the real-time call data of the at least one second user among all second users.

11. The method according to claim 1, wherein in the process of displaying the shared media stream in the floating control, the method further comprises:
adjusting a size of the floating control according to a media content in the shared media stream which is currently displayed.

12. The method according to claim 1, wherein the displaying a control in the floating control comprises:
in response to a third user joining the shared interaction, displaying a fourth control in the floating control, wherein the fourth control is configured to display a user identifier corresponding to the third user.

13. The method according to claim 1, further comprising:
in response to a trigger operation of the first user for a first user identifier in the floating control, when it is determined that the shared interaction is initiated in a video call scene, determining whether at least one of a call image at the first user side or a call image at the second user side is turned on, and switching the first interface to a video call interface in response to a determination result that at least one of the call image at the first user side or the call image at the second user side is turned on; or,
in response to the trigger operation of the first user for the first user identifier in the floating control, switching the floating control to a video call mode, wherein in the video call mode, the floating control comprises at least one of a video call picture of the first user or a video call picture of a user corresponding to the first user identifier.

14. The method according to claim 1, further comprising:
closing the floating control in response to a determination result that the shared interaction is not initiated in the video call scene.

15. The method according to claim 1, wherein the second control comprises at least one from a group consisting of: a shared user invitation control, a shared interface switching control, a media content switching control in the shared media stream, a video picture control for real-time call or a voice control for real-time call.

16. The method according to claim 1, further comprising:
after switching from the first interface to a preset interface in the preset application program, continuously displaying the floating control in the preset interface, and continuously displaying the shared media stream in the floating control.

17. The method according to claim 16, wherein the floating control exists in a form of a custom view, a control is encapsulated in the custom view, and the shared media stream is displayed by a player started in the custom view;
wherein, the after switching from the first interface to a preset interface in the preset application program, continuously displaying the floating control in the preset interface, and continuously displaying the shared media stream in the floating control, comprises:
removing the custom view from the first interface in response to a switching operation of switching the first interface to a third interface, determining whether the third interface is in a preset white list, determining that the third interface is the preset interface in response to a determination result that the third interface is in the preset white list, and displaying the third interface;
adding the custom view to the third interface, and continuously displaying the shared media stream by using the player.

18. An electronic device comprising:
at least one processor;
storage apparatus configured to store at least one program, when the at least one program is executed by the at least one processor, the at least one processor is enabled to realize a shared media stream method, which comprises:
triggering to determine a shared media stream comprising a plurality of media contents in response to a media stream sharing operation, wherein the shared media stream is provided for a shared interaction between a first user and at least one second user;
displaying a first content corresponding to the first user in a first interface of a preset application program, displaying a floating control in the first interface, and displaying a shared media stream in the floating control, wherein two adjacent media contents in the shared media stream are configured for at least one of automatic switching or manual switching; and
displaying a control in the floating control, wherein the control is configured to at least one of the following: displaying associated information of the shared interaction between the first user and the at least one second user or controlling the shared interaction between the first user and the at least one second user,
wherein the displaying a control in the floating control comprises:
displaying a session message generated in the shared interaction in the floating control, wherein the session message comprises characters, and the characters are displayed upon an image of the shared media stream in the floating control;

displaying a second control in the floating control in response to a trigger operation of the first user on the floating control, wherein the second control is configured to control the shared interaction between the first user and the at least one second user, wherein the method further comprises:

in response to a trigger operation of the first user to a floating control closing control and determining that the shared interaction is initiated in a video call scene, switching the first interface to a video call interface, hiding the floating control, and displaying, in the video call interface, a return control configured to return to the first interface and display the floating control.

19. A non-transitory storage medium comprising computer-executable instructions, wherein the computer-executable instructions, when executed by a computer processor, are used to perform a shared media stream method, which comprises:

triggering to determine a shared media stream comprising a plurality of media contents in response to a media stream sharing operation, wherein the shared media stream is provided for a shared interaction between a first user and at least one second user;

displaying a first content corresponding to the first user in a first interface of a preset application program, displaying a floating control in the first interface, and displaying a shared media stream in the floating control, wherein two adjacent media contents in the shared media stream are configured for at least one of automatic switching or manual switching; and displaying a control in the floating control, wherein the control is configured to at least one of the following: displaying associated information of the shared interaction between the first user and the at least one second user or controlling the shared interaction between the first user and the at least one second user, wherein the displaying a control in the floating control comprises:

displaying a session message generated in the shared interaction in the floating control, wherein the session message comprises characters, and the characters are displayed upon an image of the shared media stream in the floating control;

displaying a second control in the floating control in response to a trigger operation of the first user on the floating control, wherein the second control is configured to control the shared interaction between the first user and the at least one second user, wherein the method further comprises:

in response to a trigger operation of the first user to a floating control closing control and determining that the shared interaction is initiated in a video call scene, switching the first interface to a video call interface, hiding the floating control, and displaying, in the video call interface, a return control configured to return to the first interface and display the floating control.

\* \* \* \* \*